United States Patent
Ocher et al.

(10) Patent No.: US 12,541,735 B2
(45) Date of Patent: Feb. 3, 2026

(54) VIRTUAL LOCATION-AWARE REPORTING IN METAVERSE SYSTEMS

(71) Applicant: SAP SE, Walldorf (DE)

(72) Inventors: Alexander Ocher, San Jose, CA (US); Andrey Belyy, Sunnyvale, CA (US); Viktor Lapitski, Mountain View, CA (US)

(73) Assignee: SAP SE, Walldorf (DE)

( * ) Notice: Subject to any disclaimer, the term of this patent is extended or adjusted under 35 U.S.C. 154(b) by 198 days.

(21) Appl. No.: 18/518,208

(22) Filed: Nov. 22, 2023

(65) Prior Publication Data

US 2025/0165900 A1  May 22, 2025

(51) Int. Cl.
*G06F 3/04815* (2022.01)
*G06F 3/16* (2006.01)
*G06Q 10/067* (2023.01)

(52) U.S. Cl.
CPC ....... *G06Q 10/067* (2013.01); *G06F 3/04815* (2013.01); *G06F 3/167* (2013.01)

(58) Field of Classification Search
CPC .................................................. G06F 3/048–05
See application file for complete search history.

(56) References Cited

U.S. PATENT DOCUMENTS

| | | | |
|---|---|---|---|
| 5,930,399 A | 7/1999 | Kadyk et al. | |
| 8,164,492 B2 | 4/2012 | Esbensen | |
| 8,214,446 B1 * | 7/2012 | Siegel | G06F 21/31 713/168 |
| 2009/0222274 A1 * | 9/2009 | Hamilton | G06Q 30/0185 705/318 |
| 2009/0307257 A1 * | 12/2009 | Menon | G06F 16/2465 707/999.102 |
| 2010/0082798 A1 * | 4/2010 | Bhogal | G06Q 10/10 709/224 |
| 2010/0162149 A1 * | 6/2010 | Sheleheda | A63F 13/65 715/764 |
| 2015/0112769 A1 * | 4/2015 | Collins | G06Q 10/0637 705/7.36 |
| 2025/0050207 A1 * | 2/2025 | O'Sullivan | A63F 13/79 |
| 2025/0071157 A1 * | 2/2025 | Powell | G06F 3/0482 |
| 2025/0077342 A1 | 3/2025 | Schroeder et al. | |

OTHER PUBLICATIONS

Keiser et al., "Validating UTF-8 in less than one instruction per byte," Software: Practice and Experience 51.5 (2021), pp. 950-964 (2021).

* cited by examiner

*Primary Examiner* — Daniel Rodriguez
(74) *Attorney, Agent, or Firm* — Klarquist Sparkman, LLP (57) ABSTRACT

Systems and processes for generating location-aware reports corresponding to a location of an avatar in a metaverse world are provided. In a method for generating location-aware reports, a virtual location of an avatar in a metaverse world associated with a metaverse application is retrieved. The virtual location may be processed to generate a processed virtual location that is compatible with an enterprise system, and a reporting table is populated in a backend of the enterprise system to generate a report based on the processed virtual location of the avatar to generate a location-aware report. The location-aware report is output for presentation to a user interface of the metaverse application, such as an avatar mode user interface, enabling a user to view the report while in an avatar mode of the metaverse application.

19 Claims, 8 Drawing Sheets

VIRTUAL LOCATION-AWARE REPORTING IN METAVERSE SYSTEMS

BACKGROUND

The term "metaverse" is often used to describe an immersive 3D virtual space, which includes a virtual environment in which humans are represented by an avatar. In this way, users may interact with other users or entities, both socially and economically, through their respective avatars and with software agents in a virtual space. The virtual environment in a metaverse may be built upon a metaphor of the real world, although often without the physical limitations of the real world. In a metaverse application, users may experience various virtual locations by flying, teleporting, or otherwise traveling through the metaverse and/or to other metaverse worlds.

In some examples, a virtual environment in a metaverse may be representative of a real-world location. However, there are actions and activities that a user can do in the real world that currently cannot be achieved while in a metaverse due to a separation between computing systems responsible for servicing the metaverse and computing systems responsible for servicing real-world enterprises or other entities. Accordingly, there remains a need for improved technologies to coordinate enterprise or other entity-related activities, such as reports generation, with an avatar's location in a metaverse to allow the activities to be performed while in the metaverse.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the detailed description is directed to various innovative technologies for generating location-aware reports based on a location of an avatar in a metaverse. In some examples, the disclosed technologies can be implemented as computer-readable media storing instructions which, when executed by one or more hardware processors, cause the hardware processors to perform the following actions. A request from a user controlling an avatar in a metaverse application to generate a location-aware report is received. A location of the avatar in a metaverse world corresponding to the metaverse application is identified. The location of the avatar is sent to a location-aware report generating service to control the location-aware report generating service to generate a report in correspondence to the location of the avatar. The generated report is retrieved and output for presentation in an avatar mode user interface for the metaverse application.

In some examples, the disclosed technologies can be implemented as a method performed by a computer. A virtual location of an avatar in a metaverse world associated with a metaverse application is retrieved. The virtual location is processed to generate a processed virtual location that is compatible with an enterprise system. A reporting table is populated in a backend of the enterprise system to generate a report based on the processed virtual location of the avatar to generate a location-aware report. The location-aware report is output for presentation to a user interface of the metaverse application.

In some examples, the disclosed technologies can be implemented in a system including one or more hardware processors with coupled memory, and computer-readable media storing instructions executable by the one or more hardware processors. The instructions include first, second, third, fourth, and fifth instructions. The first instructions, when executed, cause a request to be received, while a user is controlling an avatar in a metaverse world via a user interface of a metaverse application, to generate a report corresponding to a virtual location of the avatar in the metaverse world. The second instructions, when executed, cause the virtual location of the avatar to be determined. The third instructions, when executed, cause a data collection job to be triggered to collect data corresponding to parameters of the request based on the virtual location of the avatar. The fourth instructions, when executed, cause the report to be generated including the collected data, the report corresponding to a real-world location represented in the metaverse world at the virtual location of the avatar. The fifth instructions, when executed, cause the report to be output for presentation via the user interface of the metaverse application.

The foregoing and other objects, features, and advantages of the invention will become more apparent from the following detailed description, which proceeds with reference to the accompanying figures.

DETAILED DESCRIPTION

Introduction and Overview

As described above, a metaverse system may be used to provide a metaverse environment, which may be explored and/or interacted with via avatars representing users of the metaverse. A metaverse system may include one or more metaverse servers configured to host one or more metaverse applications and/or other components to manage a metaverse environment. A user may enter the metaverse using a client computer that connects to the metaverse server(s) and/or otherwise accesses the metaverse application(s), and interact with the metaverse using an avatar (e.g., a virtual representation of the user) generated and/or tracked by the metaverse application(s). Metaverse applications are gaining more attention in enterprise realms, as the use of metaverse applications may increase the productivity of users through seamless virtual travel between real-world locations represented in the metaverse. However, while the metaverse may provide a virtual representation of a real-world location, a user typically has to go outside of the metaverse in order to perform actions, such as generating a report, relevant to the real-world location. For example, the user may exit the metaverse application, minimize a browser/application window for the metaverse application, remove a virtual computing headset, and/or otherwise switch focus from the metaverse application to another application (e.g., an enterprise application associated with the real-world location) in order to perform the action.

This disclosure describes a new approach to provide reporting that is linked to a virtual location of an avatar of a metaverse system. The disclosed technologies enable reports to be automatically generated based on a location of an avatar within a metaverse environment without a user leaving an avatar view mode of the metaverse application. The disclosed technologies may provide virtual location-aware report generation, for use in a variety of applications, such as metaverse virtual and/or augmented reality applications in coordination with applications executing on other systems, such as enterprise applications, examples of which are described in more detail below.

Example System

Figure 1:
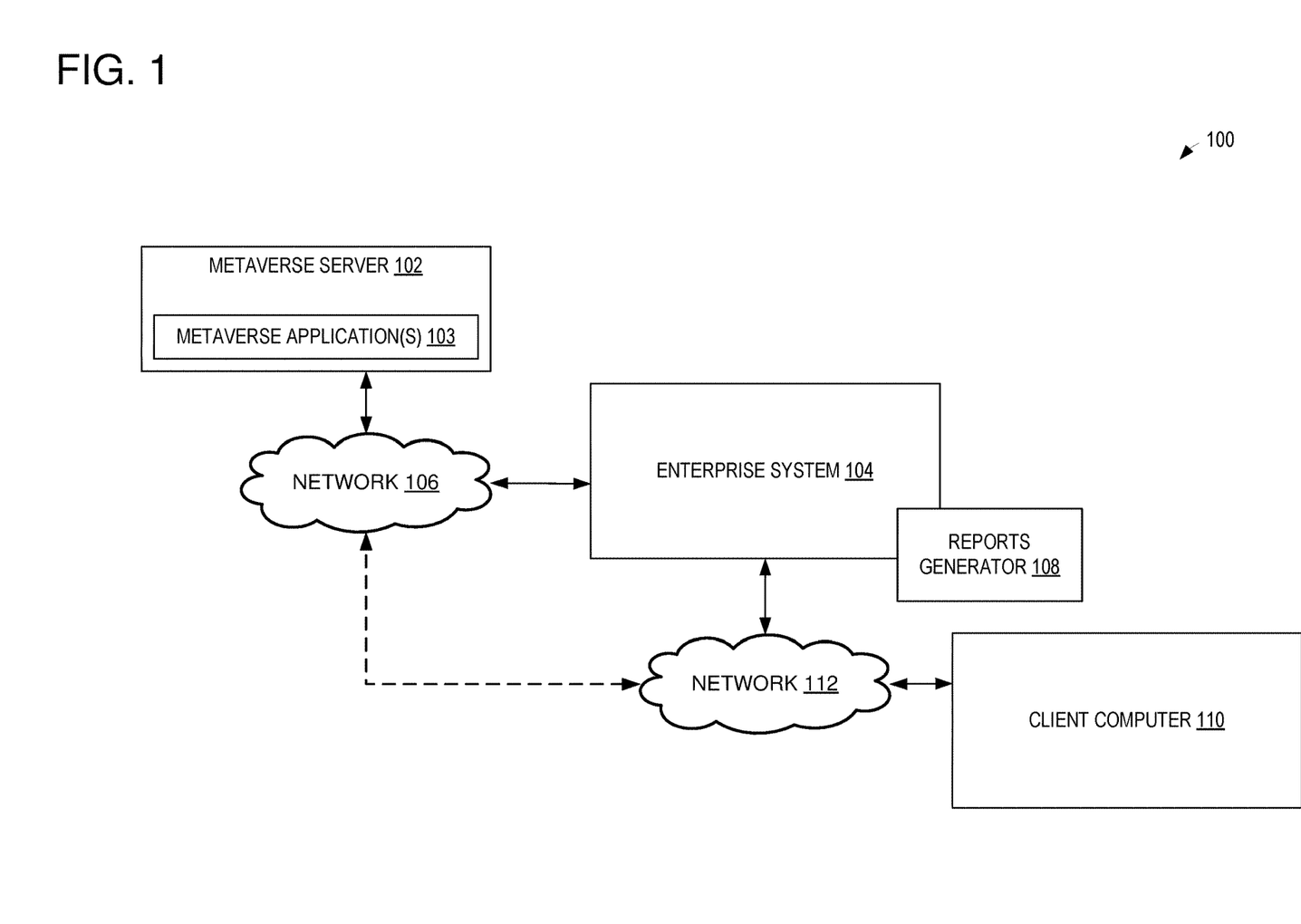
FIG. 1 is a block diagram of an example system for generating location-aware reports based on a virtual location of an avatar in a metaverse environment in accordance with examples of the present disclosure.

FIG. 1 shows an example block diagram of a system 100 for generating location-aware reports in a metaverse environment in accordance with examples of the present disclosure. In some examples, a metaverse server 102 may store and/or execute data and/or instructions relating to one or more metaverse applications 103. The metaverse server 102 may include and/or be implemented in accordance with one or more computing systems or environments, examples of which are described in more detail below with respect to FIGS. 7 and 8 below. For example, the metaverse applications 103 may include one or more applications configured to generate and/or manage one or more metaverse worlds. Managing the metaverse worlds may include generating and/or updating virtual locations in the worlds (e.g., at least some of which may correspond to real-world locations) and interactions of avatars (representing users of the metaverse) with the virtual locations and/or other avatars.

The system may further include an enterprise system 104, configured to perform one or more operations and/or execute one or more applications corresponding to an enterprise or other entity (e.g., a business entity). The enterprise system 104 may include and/or be implemented in accordance with one or more computing systems or environments, examples of which are described in more detail below with respect to FIGS. 7 and 8 below. As shown, the enterprise system 104 may include and/or be in communication with a reports generator 108, which may be configured to generate reports in association with the enterprise or other entity corresponding to the enterprise system 104 (and/or other entities). As used herein, reports may refer to documents, files, and/or other data or data structures that include information on a targeted subject (e.g., information regarding operations [e.g., in an enterprise], a status of one or more components or entities [e.g., in an enterprise], forecast or predicted/expected data for one or more components or entities [e.g., in an enterprise], data or research regarding the targeted subject, etc.). In some examples, reports may include presentations (e.g., interactive audio and/or visual presentations), instruction manuals, text documents, spreadsheets, files or instructions for controlling other components, and/or other data objects. Reports may be configured for sharing between users (e.g., including security mechanisms to control the viewing, modification, and/or distribution of the reports based on authorization or authentication details, in some examples). In some examples, reports may be generated with intentionally incorrect or incomplete data for training purposes.

In some examples, a user of a client computer 110 may connect to the enterprise system 104 via a network 112 in order to generate reports using the reports generator 108. The client computer 110 may include and/or be implemented in accordance with one or more computing systems or environments, examples of which are described in more detail below with respect to FIGS. 7 and 8 below. For example, the client computer 110 may be configured to execute an application that interfaces with the enterprise system 104 to request, receive, and present reports relating to the enterprise or other entity corresponding to the enterprise system 104. However, as described in more detail below with respect to FIG. 2, the reports generator 108 may also be configured to generate reports based on a location of an avatar in a metaverse managed by the metaverse server 102 and/or metaverse application(s) 103.

For example, the user may wish to generate reports while interacting with a metaverse world managed by the metaverse server 102 and/or metaverse application(s) 103. Accordingly, the client computer may additionally or alternatively be configured to execute an application that interfaces with the metaverse server 102 and/or accesses the metaverse application(s) 103 to allow the user to enter and interact with the metaverse world. The client computer may connect to the metaverse server 102 via network 112 and/or network 106 (which may be portions of the same network in some examples, and/or which may be connected to one another via one or more intermediate networks, such as the Internet in other examples) directly and/or via the enterprise system 104. Once connected, the client computer 110 may provide a user interface that enables the user to navigate the metaverse via an avatar, as described above.

As further described above, the metaverse managed by the metaverse server 102 and/or metaverse application(s) 103 may include locations corresponding to the enterprise or other entity associated with the enterprise system 104. Accordingly, the reports generator 108 may utilize information relating to the location of the avatar in order to generate reports relating to the avatar's location in the metaverse (e.g., which may be representative of a real-world location associated with the enterprise or other entity).

Figure 2:
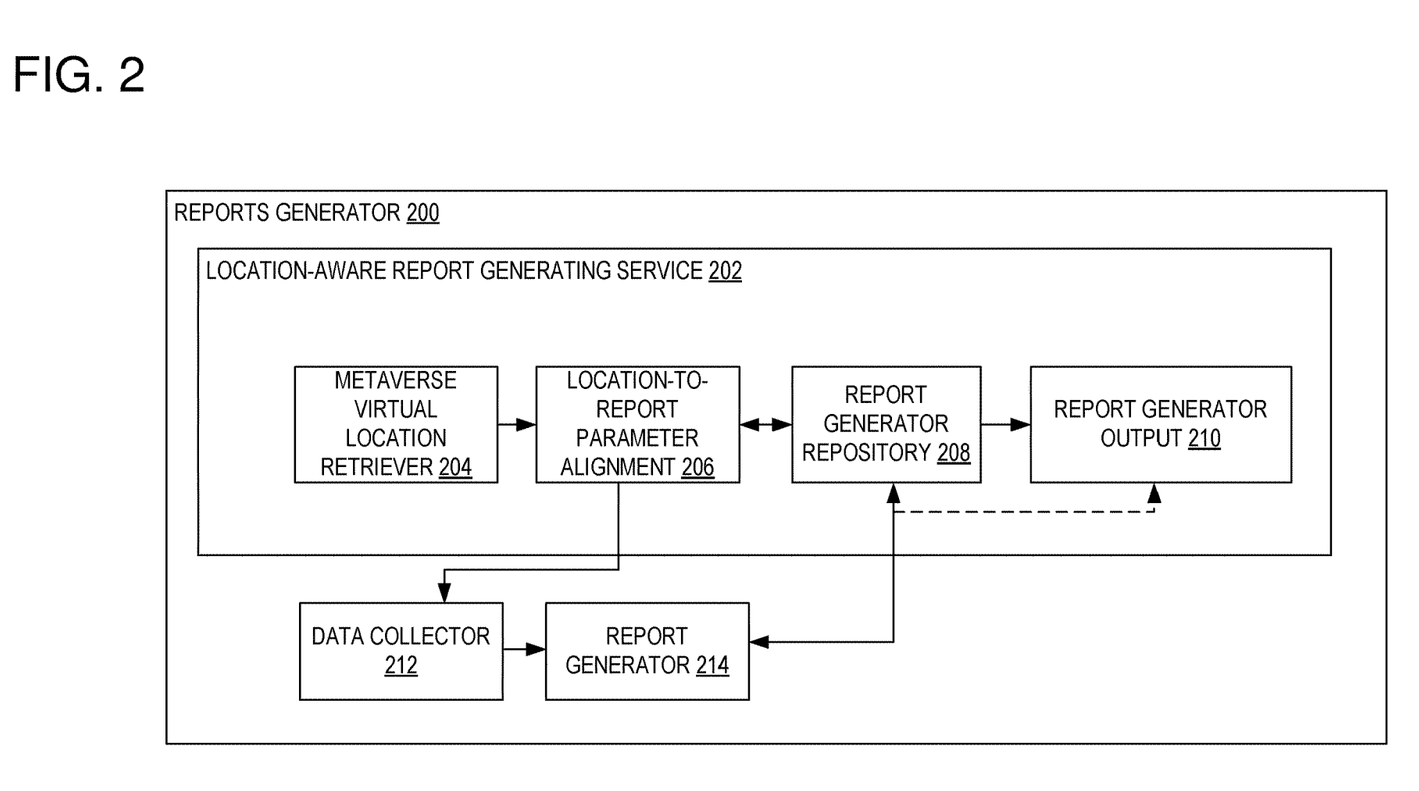
FIG. 2 is a block diagram of an example location-aware reporting system in accordance with examples of the present disclosure.

FIG. 2 shows a detailed example of a reports generator 200, which may be an example of reports generator 108 of FIG. 1, and which may be used to generate the location-aware reports for the user while the user is in a metaverse as described above. For example, the reports generator 200 includes a location-aware report generating service 202, which includes a metaverse virtual location retriever 204, a location-to-report parameter alignment service 206, a report generator repository 208, and a report generator output service 210. The report generator 200 may include instructions executable to provide the location-aware report generating service 202 and/or to perform the operations discussed herein relating to the components of the location-aware report generating service 202. It is to be understood that the reports generator 200 may include one or more computing systems, examples of which are described below with respect to FIGS. 7 and 8, configured to store and/or process the above-described instructions in some examples.

The metaverse virtual location retriever 204 may be configured to query a metaverse application for a location of an avatar in a metaverse world (e.g., an avatar corresponding to a user requesting a report to be generated). As described above, the location of the avatar may be provided to the metaverse virtual location retriever 204 in the form of a set of coordinates for the avatar. The retrieved metaverse virtual location may be provided to the location-to-report parameter alignment service 206, which may be configured to determine parameters for a report to be generated based on the virtual location of the avatar in the metaverse. For example, a type of report, a targeted region/room or building (e.g., a real-world region/room or building that is represented in the metaverse in a vicinity of the retrieved virtual location of the avatar) for the report, and/or other parameters may be selected for the report based on the retrieved virtual location. In some examples, the location-to-report parameter alignment service 206 or the metaverse virtual location retriever 204 may be configured to process avatar coordinates received from a metaverse application or server to convert the coordinates into a format that is compatible with the enterprise system and/or with other elements of the reports generator 200, such as a data collector 212 and report generator 214, described in more detail below.

The report generator repository 208 may include stored data relating to report generation, including previously-generated reports, report templates, data for filling in reports, and/or other reporting information. In some examples, responsive to receiving a request to generate a report, the virtual location of the avatar and/or parameters of the report determined by the location-to-report parameter alignment service 206 may be used to select a corresponding report in the report generator repository 208. For example, if a report for a location corresponding to the retrieved virtual location of the avatar had already been generated within a threshold period of time from the request (e.g., where the threshold time is set by an administrator or other user of the enterprise system and/or reports generator 200, and/or where the threshold time is based on a type of report, a location corresponding to the report, and/or other parameters of the requested report), a report may be retrieved from the report generator repository 208 (e.g., without triggering a new data collection job to generate a new report), and the retrieved report may be output via the report generator output service 210 to a user interface (e.g., an avatar mode user interface of the metaverse application).

In additional or alternative examples, the request for the report may trigger a data collection job performed by the data collector, which uses location information such as the virtual location of the avatar retrieved by the metaverse virtual location retriever 204 and/or other parameters selected by the location-to-report parameter alignment service 206 to collect data for the report. In some examples, the coordinates of the location may be in the form of "[world].[z].x.y" where the first two parameters are optional (e.g., corresponding to a metaverse world in which the avatar is located and an altitude or depth direction of the avatar in the metaverse world, respectively). The values of the coordinates may be auto-scaled (e.g., mapped to an area in the metaverse and/or mapped to a real-world location represented in the metaverse world) to suit a requested report, and the location (e.g., the auto-scaled location) may be used by the data collector in selection criteria having a form such as "Select . . . [ ]" "From . . . [ ]" "Where . . . [ ]" "Location='[location determined based on scaled location, e.g., Plant 1]'. The data collection job then runs and the report generator 214 may populate tables of a report template with the collected data in order to generate the report (e.g., in an enterprise backend), and then send the generated report to the report generator repository 208 and/or the report generator output service 210 in order to cache the report and/or to output the report to an avatar mode user interface of a metaverse application. In some examples, the report generator 214 may utilize one or more historical reports from the report generator repository 208 (e.g., selected based on the virtual location of the avatar and/or other parameters for the report, for example, selected to correspond to a prior report request received in association with the virtual location of the avatar) to at least partially generate the report, and augment and/or update the retrieved historical report to generate a new/updated report that is provided to the report generator repository 208 and/or report generator output service 210 for caching and/or output to an avatar mode user interface of a metaverse application. In some examples, reports may be pre-generated by a machine learning and/or artificial intelligence engine based on similarity using additional attributes, such as user type and location type. In some examples, instead of using the avatar location retrieved by the metaverse virtual location retriever 204, the data collector may use a user-overwritten location (e.g., if a user wishes to generate a report for another location other than the location at which the avatar is currently located).

The generated report may correspond to a location of the avatar by having a structure and/or by including data that is relevant to the location of the avatar, where the location of the avatar is representative of a location in the real-world. Some non-limiting examples of reports include a weather report for a ski resort that is represented in the metaverse at a location that matches and/or includes the coordinates of the avatar (e.g., where the report includes historical and/or predicted snow levels for the ski resort and/or other weather data for the ski resort), a radiation report for a nuclear plant robot of a nuclear plant that is represented in the metaverse at a location that matches and/or includes the coordinates of the avatar, a manufacturing history for a selected department of a factory in which the avatar is located (e.g., based on a representative location of the factory in the metaverse), a report with instructions to fix a gas pipe leak for a building in which the avatar is located (e.g., based on a representative location of the building in the metaverse), etc.

Example Method—Generating Virtual Location-Based Reports

Figure 3:
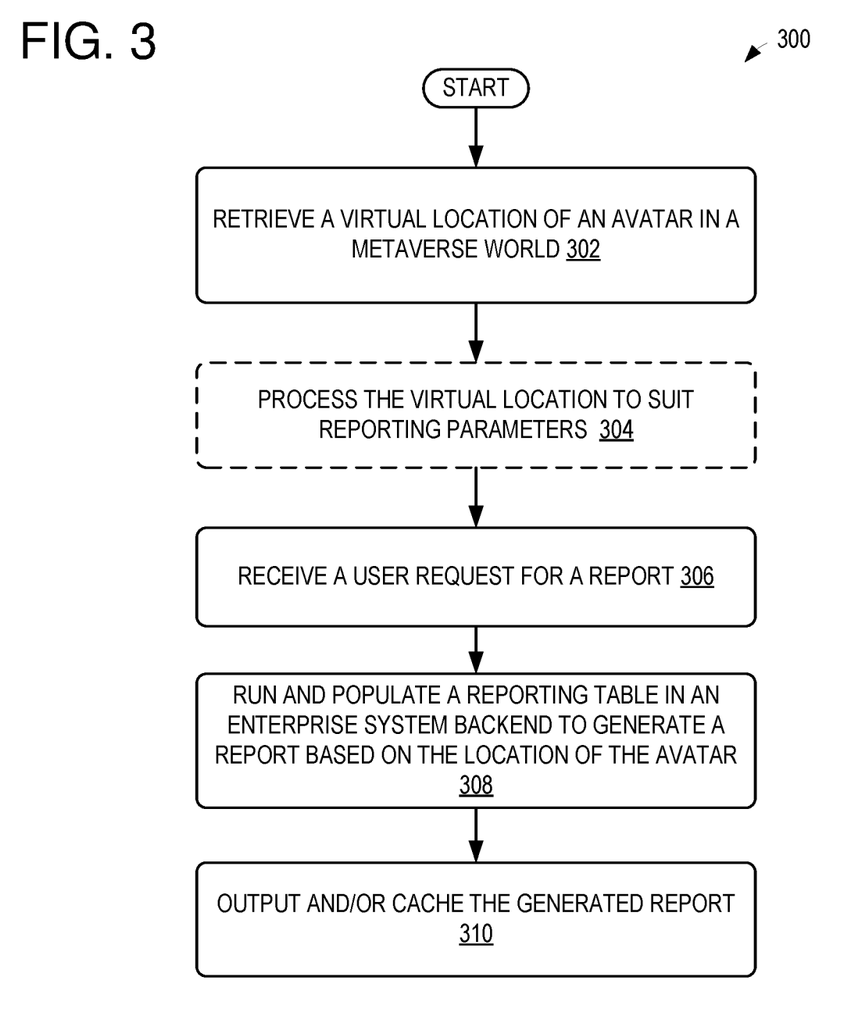
FIG. 3 is a flow chart of an example method for generating reports based on a location of an avatar in a metaverse environment in accordance with examples of the present disclosure.

FIG. 3 is a flowchart of an example method 300 for generating reports based on a location of an avatar in a metaverse environment in accordance with one or more examples of the present disclosure. For example, method 300 may be performed by one or more components of a system, such as a system 100 of FIG. 1 and/or location-aware reporting generating service 202 of FIG. 2. In some examples, method 300 may be performed by executing instructions of a location-aware reporting generating service and/or other components described above with respect to FIGS. 1 and 2.

At 302, the method includes retrieving a virtual location of an avatar in a metaverse world. For example, a metaverse application may track the virtual location of the avatar as a user moves the avatar within the metaverse world. In some examples, the virtual location of the avatar is tracked in a coordinate system, which may include an x (e.g., horizontal)

and y (e.g., vertical) position within the metaverse world. In additional or alternative examples, such as examples in which the metaverse world is a three-dimensional space that allows for three-dimensional movement, the coordinate system may also include a z (e.g., a depth direction of the three-dimensional world). In further additional or alternative examples, the coordinate system may map to positions within a three-dimensional space that either do or do not include altitude movement (e.g., based on whether avatars are allowed to "fly" or otherwise change altitude in the metaverse world). The coordinate system may also specify a metaverse world in which the avatar is located.

At 304, the method optionally includes processing the virtual location to suit one or more reporting parameters. For example, the virtual location may be translated from a coordinate system or other format native to the metaverse application to a format recognizable to and/or compatible with an enterprise system and/or report generating service. In some examples, the processing may include mapping (or attempting to map) the coordinates to a location (or to one of a plurality of locations) associated with one or more reports that are able to be generated by a reporting service, such as a location-aware report generating service (e.g., service 202 of FIG. 2, etc. as described above). For example, each location associated with one or more reports that may be generated for users may be associated with (e.g., using a mapping data structure such as a table, index, etc. mapping coordinates to locations) one or a range of coordinates in one or more metaverse worlds. In some examples, the coordinates or range of coordinates may correspond to a location in the corresponding metaverse world that is representative of a real-world position of that location. As an illustrative example, the coordinates or range of coordinates associated with a real-world manufacturing plant in a mapping data structure may correspond to a location of a virtual representation of the real-world manufacturing plant in the metaverse.

At 306, the method includes receiving a user request for a report. For example, the user request may be provided via any suitable user interface mechanism (e.g., voice command, text input, selection of a user interface element, controlling an avatar to perform an action associated with requesting a report) and/or responsive to automatic triggering (e.g., responsive to the avatar entering a designated location in the metaverse, etc.). In some examples, the user request may specify parameters for the report, such as a type of report, bounds for the report, content to be included in the report, etc. In other examples, the user may request for a report, and some or all of the parameters for the report may be automatically determined based on factors such as the virtual location of the avatar of the user, the role or authorization of the user, historical reports requested by the user or other historical activities of the user or other users (e.g., other users in the location occupied by the user's avatar), etc. It is to be understood that in some examples, the method may include retrieving the virtual location of the avatar in response to the user request (e.g., the operation at 302 and/or the optional operation at 304 may be performed after the operation at 306). In other examples, the virtual location of the avatar may be periodically or continuously retrieved (e.g., according to a default schedule, such as every second, every five seconds, etc., or responsive to a trigger such as a change in the avatar's location or a change in the avatar's location that is above a threshold), and a latest retrieved virtual location may be associated with the user request for generating the report.

At 308, the method includes running and populating a reporting table in an enterprise system backend to generate a report based on the virtual location of the avatar. For example, as described above with respect to FIGS. 1 and 2, the enterprise system may be configured to generate reports by generating a table, and populating the table with report results for a given set of parameters, including a location of an avatar in a metaverse system (e.g., mapped to a corresponding real-world location that is represented in the metaverse world in some examples).

At 310, the method includes outputting and/or caching the report generated at 308. For example, the report may be automatically output to the avatar viewing mode user interface (e.g., a graphical user interface) of the metaverse application so that the user is able to view the report without leaving the avatar mode of the metaverse application. Accordingly, the report may be output to the same user interface and/or view of a metaverse application from which the request for the report was received (e.g., so that the user is able to request and view the report without leaving the metaverse application and/or without switching to an alternative application to trigger generation of the report and/or view the report). In additional or alternative examples, a link or other user interface mechanism may be provided to allow the user to select to view the generated report in the avatar viewing mode user interface. In the above and/or alternative examples, the generated report may additionally or alternatively be cached to a historical report storage device(s). For example, caching the generated report may help to decrease a time spent generating future reports for the avatar's location (e.g., requested by the user or other users that navigate to that location). For example, a future request for a report from a user with an avatar at that location (or at coordinates associated with the location) may cause the cached report to be provided to the requesting user and/or may cause the cached report to be used to at least partially populate a new report to be provided to the requesting user (e.g., additional data for the report that was made available after the generation of the cached report may be added to create the new report). In some examples, cached reports are timestamped and/or otherwise associated with data or metadata indicating parameters of the report, a location of an avatar for a user that requested the report, information regarding the user that requested the report, etc. Cached reports may be organized in the storage device(s) based on one or more of the above-described timestamps or data in some examples.

Example Scenarios—Requesting a Report to be Generated Based on Avatar Location

Figure 4:
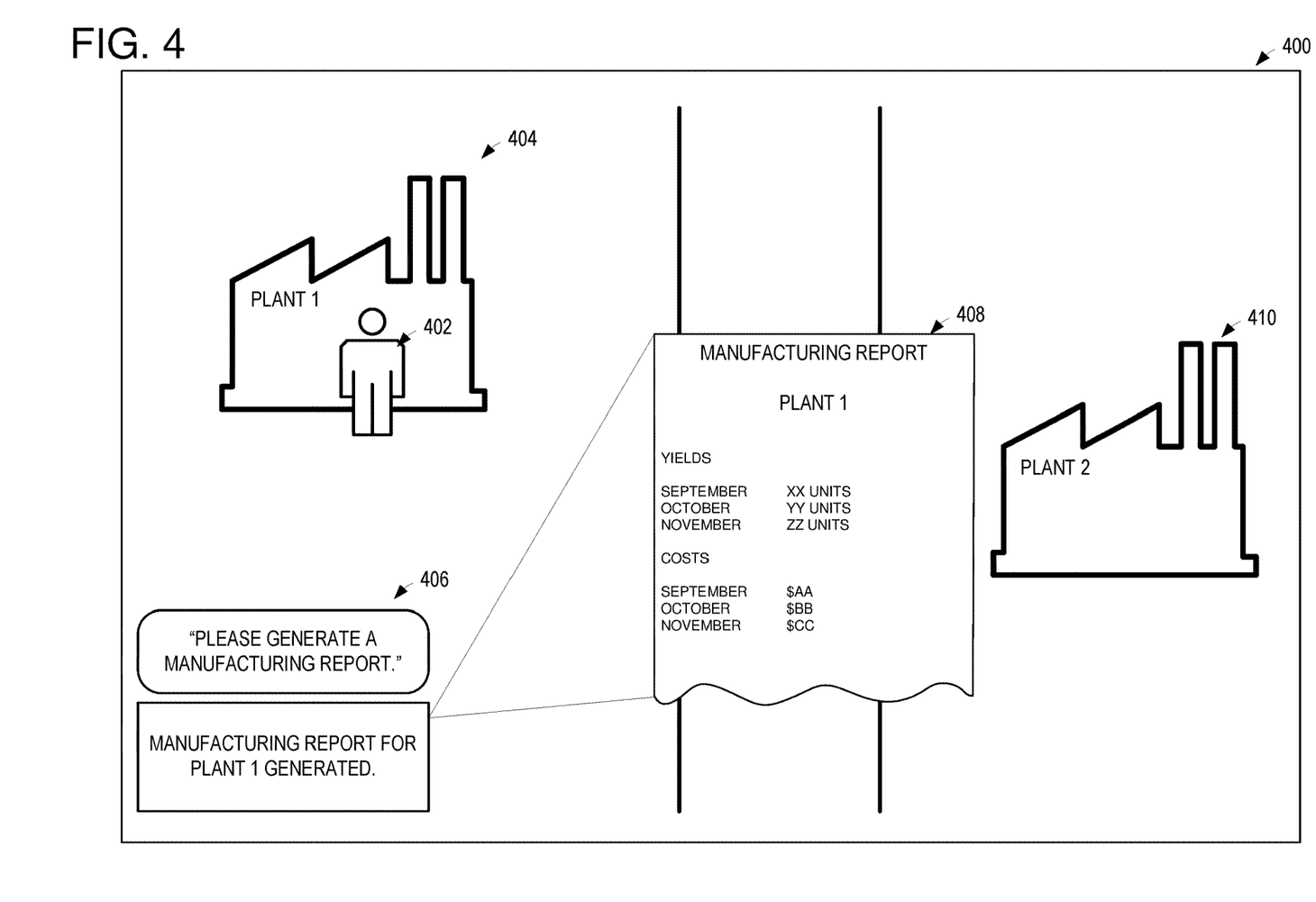
FIG. 4 is a schematic example of generating location-aware reports in a metaverse environment.
Figure 5:
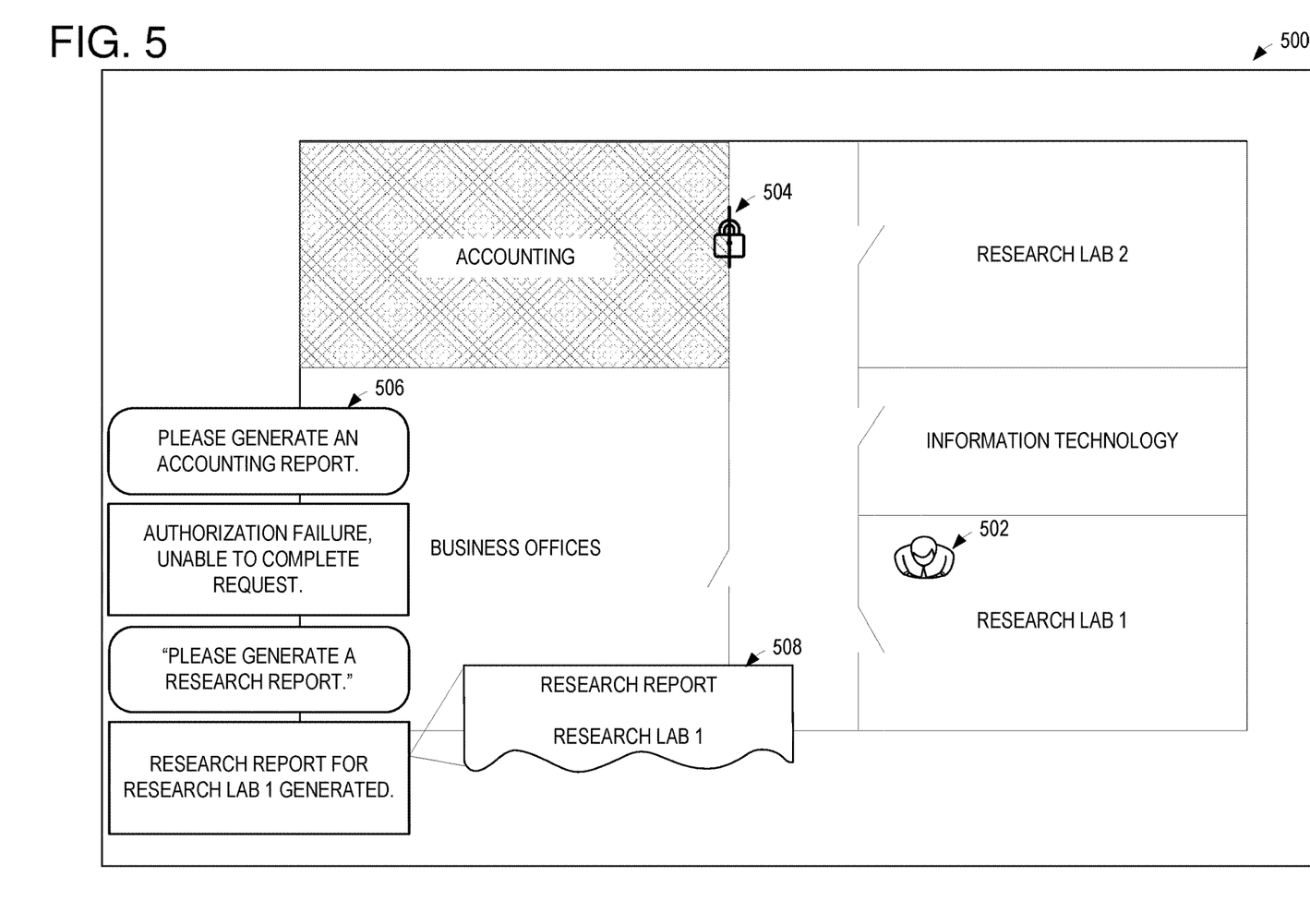
FIGS. 5 and 6 schematically show example user interface output relating to scenarios for requesting a generation of a location-aware report in a metaverse.

FIGS. 4 and 5 show different example scenarios for requesting a location-aware report to be generated while interacting with a metaverse world (e.g., in an avatar mode of a metaverse application). User interfaces 400 and 500 shown in FIGS. 4 and 5, respectively, may be interfaces for one or more metaverse applications, such as metaverse applications 103 of FIG. 1, which coordinate with a report generating service, such as reports generator 108 of FIG. 1 and/or location-aware report generating service 202 of FIG. 2. It is to be understood that the appearance of the user interfaces in FIGS. 4 and 5 are illustrative and non-limiting, and any suitable user interface appearance, views (e.g., first person, third person, isometric, etc.), mechanisms (e.g., user interface elements, user input device, support, etc.), and/or content may be employed to provide the functionality described herein relating to generating location-aware reports in a metaverse environment.

FIG. 4 shows a first example scenario in which a user of a metaverse application navigates a corresponding avatar 402 to a location in the metaverse (in this example, a vicinity of "Plant 1" 404). A view of the avatar 402 within the metaverse environment is visible to the user via the user interface 400 (e.g., a graphical user interface), and the user may control the avatar with any suitable input device, examples of which are described below with respect to FIG. 7. The user interface 400 may represent an avatar mode or view, in which the user is able to interact with the metaverse environment via the avatar 402. As shown at 406, the user may provide commands and/or receive messages from the metaverse application. For example, the user may input requests via a keyboard, microphone (e.g., or other audio/speech input device), and/or other input devices connected to a computing system executing the metaverse applications.

In the illustrated example, the user requests a report to be generated. In response, the metaverse application presents the report 408, corresponding to the avatar's location. For example, since the avatar is at Plant 1 404 (e.g., in a vicinity of Plant 1, within a threshold distance of Plant 1, and/or otherwise determined to be in a location associated with Plant 1 as described above with respect to FIG. 3), the report is configured to reflect information regarding Plant 1 404. If, in another example, the user moves the avatar to be located at Plant 2 410 (e.g., in a vicinity of Plant 2, within a threshold distance of Plant 2, and/or otherwise determined to be in a location associated with Plant 2 as described above with respect to FIG. 3), a generated report may reflect information regarding Plant 2 410. For example, the methods described above with respect to FIG. 3 and/or below with respect to FIG. 6 may be performed to generate the report 408 to be location-aware with respect to the location of the avatar 402 (e.g., without the user specifying the location). It is to be understood that in some examples, the user may specify a location to be used for generating the report, which may be provided in lieu of or in addition to the location of the avatar 402 in order to generate the report.

FIG. 5 shows an example scenario in which a requested report may not be generated due to an authorization issue. For example, user interface 500 may represent an avatar view for a metaverse application in which a user may navigate an avatar 502 through a virtual version of a real-world building. Various rooms in the building may be represented (e.g., in locations relative to one another/other elements in correspondence with a real-world layout of the building), such as the research labs 1 and 2, information technology room, business offices room, and accounting room in the illustrated example.

Access to the rooms may be controlled based on authentication or role of the user and/or other rules set by an administrator or other entity. For example, as represented by the lock icon 504, the accounting office may be inaccessible to avatars without corresponding authorization to enter the room. For example, if the user attempts to navigate the avatar 502 into the accounting room, the metaverse application may request authorization information to allow access to the room, or the metaverse application may automatically deny access based on existing credentials (e.g., identity, role, security/authorization/authentication information, etc.) for the user. Access to the virtual location may also control access to reports corresponding to the virtual location. For example, as shown at 506, the user may request an accounting report while the user's avatar is located in research lab 1 (e.g., due to an inability to access the accounting room), and the request may be denied or otherwise not completed. In other examples, the location of the avatar 502 (e.g., not within the accounting room) may trigger the metaverse application to request the user to move the avatar 502 into the accounting room and/or request authorization information to enable access to the accounting room and/or to the accounting report. If the user does not or is not able to satisfy the request from the metaverse application (e.g., if the user is not able to provide acceptable authorization information, such as a password, certificate, security key, proof of role, etc. and/or if the user is unable to navigate the avatar to the accounting room), then the metaverse application may present an indication that the report could not be generated (e.g., an example indication is shown as "authorization failure, unable to complete request" in FIG. 5, however, any suitable message, alert tone, or other indicator may be presented in other examples).

As further shown in the example of FIG. 5, the user may follow up the request for the accounting report with a request for a research report, which may be granted based on the authorization and/or role associated with the user and/or a location of the avatar 502 of the user. As shown, the metaverse application may automatically generate a research report 508 specific to research lab 1 (e.g., instead of a report for research lab 2) based on a location of the avatar 502 (e.g., since the avatar 502 is located in research lab 1).

Figure 6:
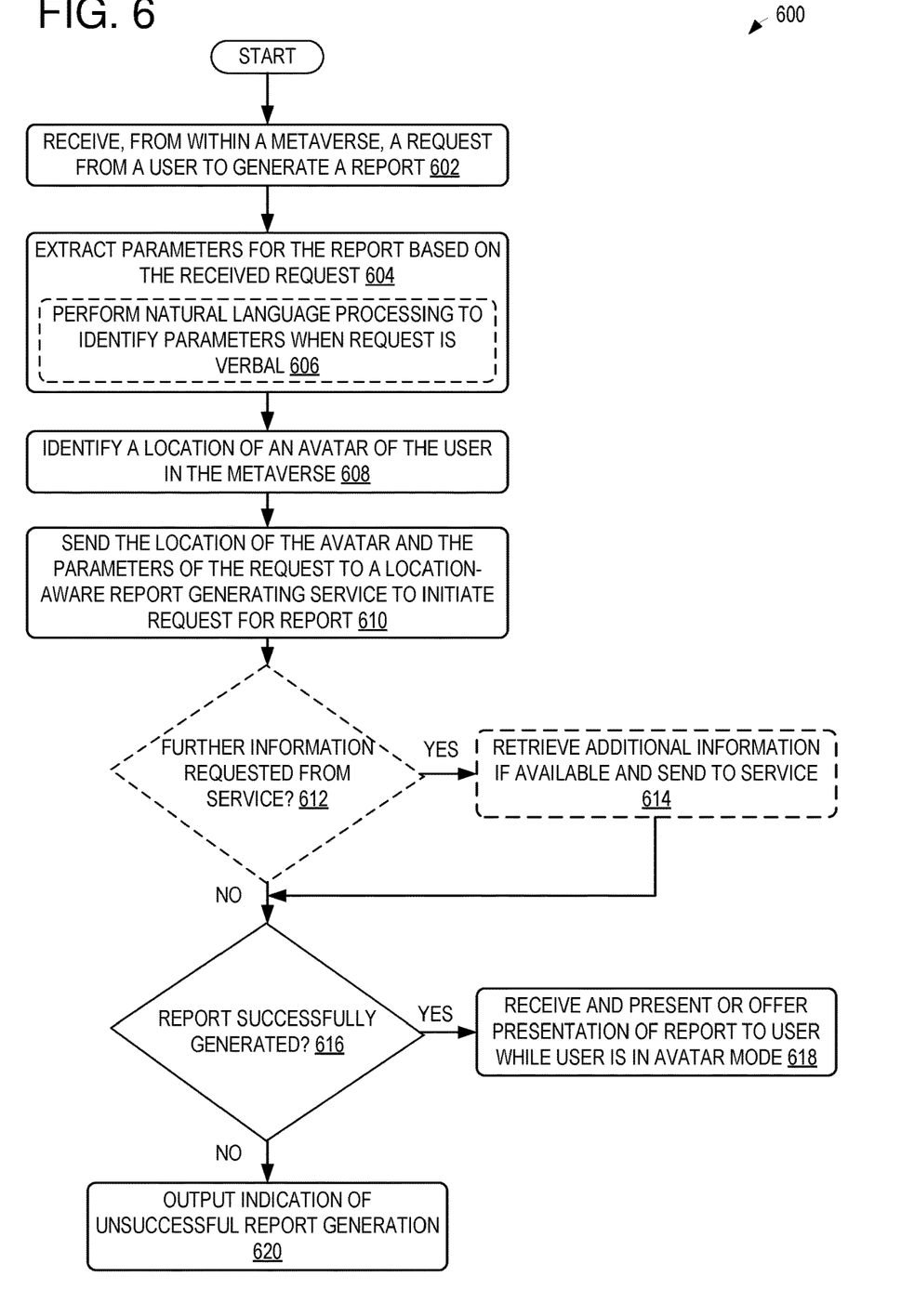

Example Method—Using a Service to Generate Virtual Location-Based Reports in a Metaverse Application FIG. 6 is a flowchart of an example method 600 for generating reports in a metaverse application based on a location of an avatar in a metaverse environment in accordance with one or more examples of the present disclosure. For example, method 600 may be performed by and/or in coordination with one or more components of a system, such as a system 100 of FIG. 1 and/or location-aware reporting generating service 202 of FIG. 2. In some examples, method 600 may be performed by executing instructions of a metaverse application to utilize a location-aware reporting generating service and/or other components described above with respect to FIGS. 1 and 2.

At 602, the method includes receiving, from within a metaverse, a request from a user to generate a report. For example, the request may be received while the user is exploring the metaverse in an avatar mode and/or otherwise using a metaverse application.

At 604, the method includes extracting parameters for the report based on the received request. For example, the request may specify a type of report, bounds for the report, and/or other parameters to control a type and/or content of the report. As indicated at 606, the method may include performing natural language processing to identify the parameters when the request is a verbal or speech request (e.g., a spoken/audible request provided to a microphone interface to the metaverse application). In other examples, the request may be received via other interfaces, such as typed using a keyboard and/or selected from a displayed menu in a graphical user interface of the metaverse application, or the request may be automatically triggered based on a condition being met, such as an avatar reaching a designated location in the metaverse, the user performing one or more associated tasks in the metaverse, etc.

At 608, the method includes identifying a location of an avatar of the user in the metaverse. For example, as described in more detail above with respect to FIG. 3 and with respect to the scenarios of FIGS. 4 and 5, a location of the avatar may be tracked by the metaverse application and may be expressed in terms of a coordinate system (e.g., a three-dimensional space). In some examples, identifying the location may include processing (e.g., formatting) the coordinates provided by the metaverse application, for example, to translate the coordinates into a format that is compatible with a location-aware report generating service and/or other service/component of an enterprise system, as described in more detail above with respect to FIGS. 2 and 3. At 610, the method includes sending the location of the avatar (e.g., the coordinates, which may be formatted as described above) and the parameters of the request to a location-aware report generating service to initiate a request for a report with the service (e.g., to control the location-aware report generating service to generate a report). For example, the location-aware report generating service may be configured to perform the operations described above with respect to report generating service 202 of FIG. 2, and may generate reports using the information (e.g., location and parameters) received from the metaverse application. In some examples, the metaverse application may directly access the location-aware report generating service (e.g., via an Application Programing Interface (API) call or other mechanism) and/or may access the location-aware report generating service via one or more intermediate systems, such as an enterprise system that utilizes the location-aware report generating service to generate reports in additional contexts (e.g., enterprise applications outside of the metaverse).

At 612, the method optionally includes determining if further information is requested from the location-aware report generating service. For example, the location-aware report generating service may request additional information about the user (e.g., identification information, historical activity, authentication information, etc.), information about the metaverse application and/or environment, and/or other additional information. If further information is requested (e.g., "YES" at 612), the method optionally includes retrieving the additional information if available and sending the information to the service. If further information is not requested (e.g., "NO" at 612) and/or after sending (or attempting to send) the requested additional information, the method includes determining if the report is successfully generated at 616.

If the report is successfully generated (e.g., if the location-aware report generating service is able to generate the report based on the received information, the authorization of the user, etc., e.g., "YES" at 616), the method includes receiving (e.g., from the location-aware report generating service, or retrieving, e.g., from a repository) and presenting or offering a presentation of the report to the user while the user is in avatar mode in the metaverse. For example, as shown in the example scenario of FIG. 4, the report may be automatically presented to the user for the user to view using the metaverse application. In additional or alternative examples, a link, user interface button, command, or other mechanism may be provided to a user to enable the user to selectively view the report if desired. In further additional or alternative examples, the report may be stored or cached and presenting the report at 618 may include presenting a mechanism (e.g., link, file identification information, access instructions, etc.) that allows the user to view the report at a later time, inside or outside of the metaverse application. If the report is not successfully generated (e.g., the location-aware report generating service does not have enough information to generate the report, the user is not authorized to request the report, etc., e.g., "NO" at 616), the method includes outputting an indication of unsuccessful report generation, as indicated at 620. For example, as shown in the example scenario of FIG. 5, a notice that the report could not be generated may be presented in a user interface of the metaverse application (e.g., while the user is still in avatar mode).

Example Advantages

This solution is superior in comparison of approaches in the past with regards to at least the following considerations. The disclosed approach allows users to view location-relevant reports without leaving a metaverse environment. Currently reporting systems do not consider a user's virtual location, and do not provide pre-generated location-specific reports that can be viewed in the metaverse. The disclosed technologies, relative to prior systems, improves a user experience in the metaverse by providing a seamless user interface for retrieving reports, and increases an accuracy and security of report generation by taking into account a location of a user's avatar in the metaverse and user authentication/authorization information.

Additional Examples

A first example of the disclosed technologies includes one or more computer-readable media storing instructions which, when executed by one or more hardware processors, cause the hardware processors to perform actions comprising: receiving a request from a user controlling an avatar in a metaverse application to generate a location-aware report, identifying a location of the avatar in a metaverse world corresponding to the metaverse application, sending the location of the avatar to a location-aware report generating service to control the location-aware report generating service to generate a report in correspondence to the location of the avatar, and retrieving the generated report and outputting the generated report for presentation in an avatar mode user interface for the metaverse application.

A second example includes the first example and further includes the one or more computer-readable media, wherein the request indicates one or more parameters for the report and wherein the actions further comprise identifying the one or more parameters and sending the one or more parameters to the location-aware report generating service to control a type or content of the report.

A third example includes one or both of the first example and the second example and further includes the one or more computer-readable media, wherein the request is received via a speech input device as a speech request while the user is viewing the metaverse world in the avatar mode user interface, and wherein the actions further comprise performing natural language processing to identify the one or more parameters for the report based on the speech request.

A fourth example includes one or more of the first example through the third example and further includes the one or more computer-readable media, wherein identifying the location includes processing coordinates of the avatar provided by the metaverse application to translate the coordinates into a format that is compatible with the location-aware report generating service.

A fifth example includes one or more of the first example through the fourth example and further includes the one or more computer-readable media, wherein the coordinates of the avatar are expressed in terms of a coordinate system in three-dimensional space.

A sixth example includes one or more of the first example through the fifth example and further includes the one or more computer-readable media, wherein retrieving the generated report includes retrieving the generated report from a repository that includes historical reports generated for the metaverse world.

A seventh example includes one or more of the first example through the sixth example and further includes the one or more computer-readable media, wherein outputting the generated report for presentation in the avatar mode user interface for the metaverse application comprises outputting a link or user interface element that is selectable by the user in the avatar mode user interface to view the report in the avatar mode user interface.

An eighth example includes one or more of the first example through the seventh example and further includes the one or more computer-readable media, wherein the actions further comprise receiving, from the location-aware report generating service, a request for further information.

A ninth example includes one or more of the first example through the eighth example and further includes the one or more computer-readable media, wherein the actions further comprise, in response to receiving the request for further information, sending the location-aware report generating service identification information or authentication information for the user.

A tenth example includes one or more of the first example through the ninth example and further includes the one or more computer-readable media, wherein the report is selectively generated based on the identification information or the authentication information, and wherein the actions further comprise outputting an indication of unsuccessful report generation responsive to a determination that the user is not authorized to request the report based on the identification information or the authentication information.

An eleventh example of the disclosed technologies includes a method performed by a computer, the method comprising retrieving a virtual location of an avatar in a metaverse world associated with a metaverse application, processing the virtual location to generate a processed virtual location that is compatible with an enterprise system, populating a reporting table in a backend of the enterprise system to generate a report based on the processed virtual location of the avatar to generate a location-aware report, and outputting the location-aware report for presentation to a user interface of the metaverse application.

A twelfth example includes the eleventh example, and further includes the method, wherein populating the reporting table comprises triggering a data collection job that uses the processed virtual location of the avatar to collect data corresponding to a real-world location associated with the processed virtual location for filling the reporting table.

A thirteenth example includes one or both of the eleventh example and the twelfth example, and further includes the method, wherein the virtual location comprises a set of coordinates for the virtual location of the avatar, and wherein processing the virtual location comprises auto-scaling the set of coordinates to map the set of coordinates to an area in the metaverse world or to the real-world location.

A fourteenth example includes one or more of the eleventh example through the thirteenth example, and further includes the method, wherein the report comprises a type of report that is selected based on one or more of the processed virtual location of the avatar or parameters of a request for the report issued from a user interface of the metaverse application.

A fifteenth example includes one or more of the eleventh example through the fourteenth example, and further includes the method, further comprising retrieving one or more of authentication information or user identification information for a user that issued the request and determining whether the user is authorized to generate or view the selected type of report based on the authentication information or user identification information, wherein the method further comprises outputting an indication of an unsuccessful report generation responsive to determining that the user is not authorized to generate or view the selected type of report.

A sixteenth example includes one or more of the eleventh example through the fifteenth example, and further includes the method, further comprising caching the generated report in a repository of the enterprise system or a report generating service associated with the enterprise system.

A seventeenth example of the disclosed technologies includes a system comprising one or more hardware processors with memory coupled thereto, and computer-readable media storing instructions executable by the one or more hardware processors, the instructions comprising first instructions to receive a request, while a user is controlling an avatar in a metaverse world via a user interface of a metaverse application, to generate a report corresponding to a virtual location of the avatar in the metaverse world, second instructions to determine the virtual location of the avatar, third instructions to trigger a data collection job to collect data corresponding to parameters of the request based on the virtual location of the avatar, fourth instructions to generate the report including the collected data, the report corresponding to a real-world location represented in the metaverse world at the virtual location of the avatar, and fifth instructions to output the report for presentation via the user interface of the metaverse application.

An eighteenth example includes the seventeenth example, and further includes the system, wherein the data collection job is performed by an enterprise system backend corresponding to an entity located at the real-world location represented in the metaverse world at the virtual location of the avatar.

A nineteenth example includes one or both of the seventeenth example and the eighteenth example, and further includes the system, wherein the virtual location of the avatar is determined by translating location information for the avatar received from the metaverse application to a format compatible with the enterprise system backend.

A twentieth example includes one or more of the seventeenth example through the nineteenth example, and further includes the system, wherein at least a portion of the report is generated using a historical report retrieved from a repository, the historical report corresponding to a prior report request received in association with the virtual location of the avatar.

A Generalized Computer Environment

Figure 7:
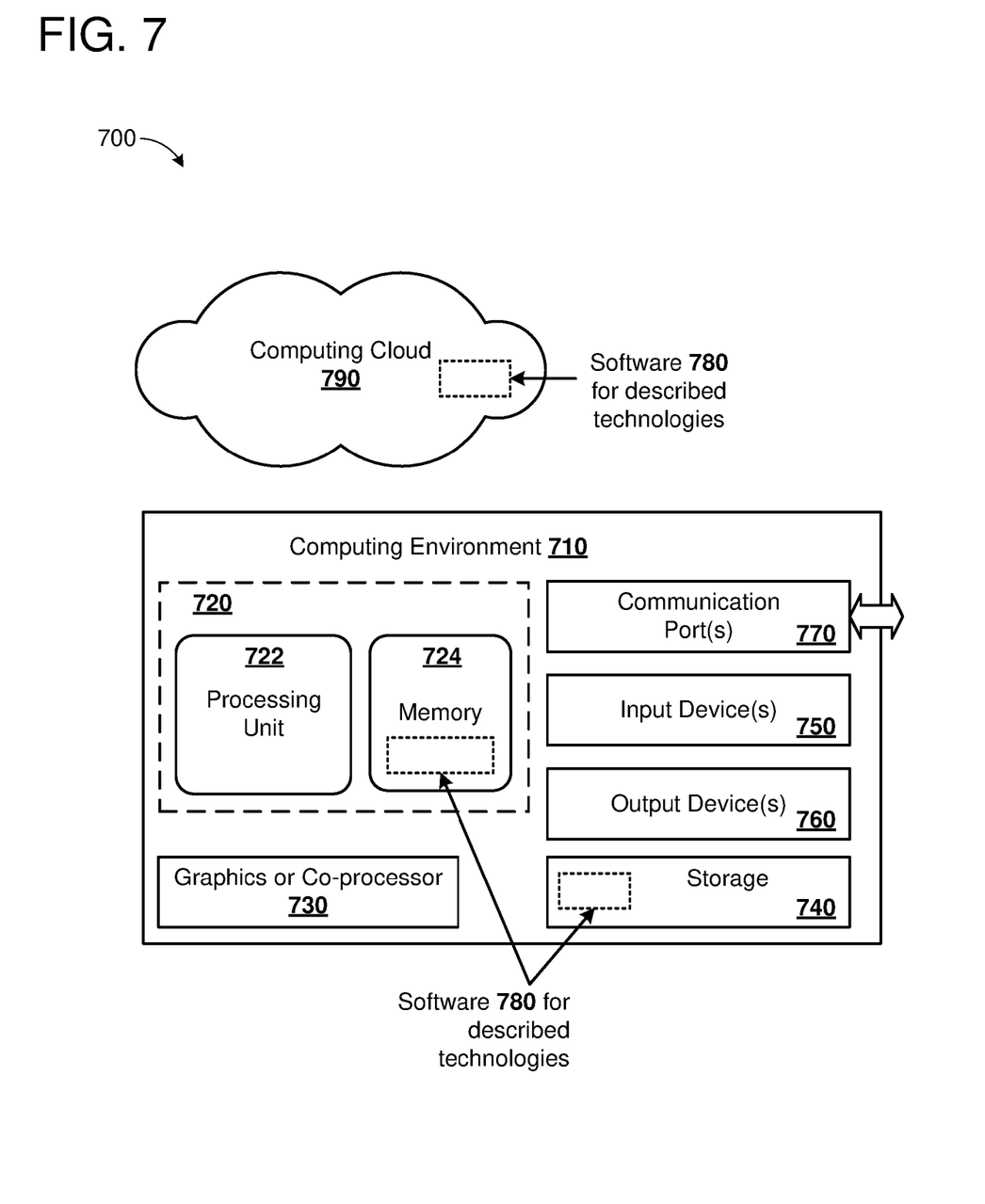
FIG. 7 is a diagram schematically depicting a computing environment suitable for implementation of disclosed technologies.

FIG. 7 illustrates a generalized example of a suitable computing system 700 in which described examples, techniques, and technologies, including generating location-aware reports for viewing in a metaverse application based on a virtual location of an avatar in a metaverse according to disclosed technologies can be implemented. For example, the computing system 700 and/or one or more elements of the computing system 700 may include and/or be included within one or more of the described components of system 100 of FIG. 1 and/or reports generator 200 of FIG. 2 and/or be used to perform operations described in correspondence to FIGS. 3-6. The computing system 700 is not intended to suggest any limitation as to scope of use or functionality of the present disclosure, as the innovations can be implemented in diverse general-purpose or special-purpose computing systems.

With reference to FIG. 7, computing environment 710 includes one or more processing units 722 and memory 724. In FIG. 7, this basic configuration 720 is included within a dashed line. Processing unit 722 executes computer-executable instructions, such as for implementing any of the methods or objects described herein for performing annotation word-to-token alignment, or various other architectures, components, handlers, managers, modules, or services described herein. Processing unit 722 can be a general-purpose central processing unit (CPU), a processor in an application-specific integrated circuit (ASIC), or any other type of processor. In a multi-processing system, multiple processing units execute computer-executable instructions to increase processing power. Computing environment 710 can also include a graphics processing unit or co-processing unit 730. Tangible memory 724 can be volatile memory (e.g., registers, cache, or RAM), non-volatile memory (e.g., ROM, EEPROM, or flash memory), or some combination thereof, accessible by processing units 722, 730. The memory 724 stores software 780 implementing one or more innovations described herein, in the form of computer-executable instructions suitable for execution by the processing unit(s) 722, 730. The memory 724 can also store footprint calculation data, a composite graph data structure, including nodes, edges, and their respective attributes; a table or other data structure indicating states of a modeled system, configuration data, User Interface (UI) displays, browser code, data structures including data tables, working tables, change logs, output structures, input fields, output fields, data values, indices, or flags, as well as other operational data.

A computing system 710 can have additional features, such as one or more of storage 740, input devices 750, output devices 760, or communication ports 770. An interconnection mechanism (not shown) such as a bus, controller, or network interconnects the components of the computing environment 710. Typically, operating system software (not shown) provides an operating environment for other software executing in the computing environment 710, and coordinates activities of the components of the computing environment 710.

The tangible storage 740 can be removable or non-removable, and includes magnetic disks, magnetic tapes or cassettes, CD-ROMs, DVDs, or any other medium which can be used to store information in a non-transitory way and which can be accessed within the computing environment 710. The storage 740 stores instructions of the software 780 (including instructions and/or data) implementing one or more innovations described herein.

The input device(s) 750 can be a mechanical, touch-sensing, or proximity-sensing input device such as a keyboard, mouse, pen, touchscreen, trackball, a voice input device, a scanning device, or another device that provides input to the computing environment 710. The output device(s) 760 can be a display, printer, speaker, optical disk writer, or another device that provides output from the computing environment 710.

The communication port(s) 770 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 700 can also include a computing cloud 790 in which instructions implementing all or a portion of the disclosed technology are executed. Any combination of memory 724, storage 740, and computing cloud 790 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

Example Cloud Computing Environment

Figure 8:
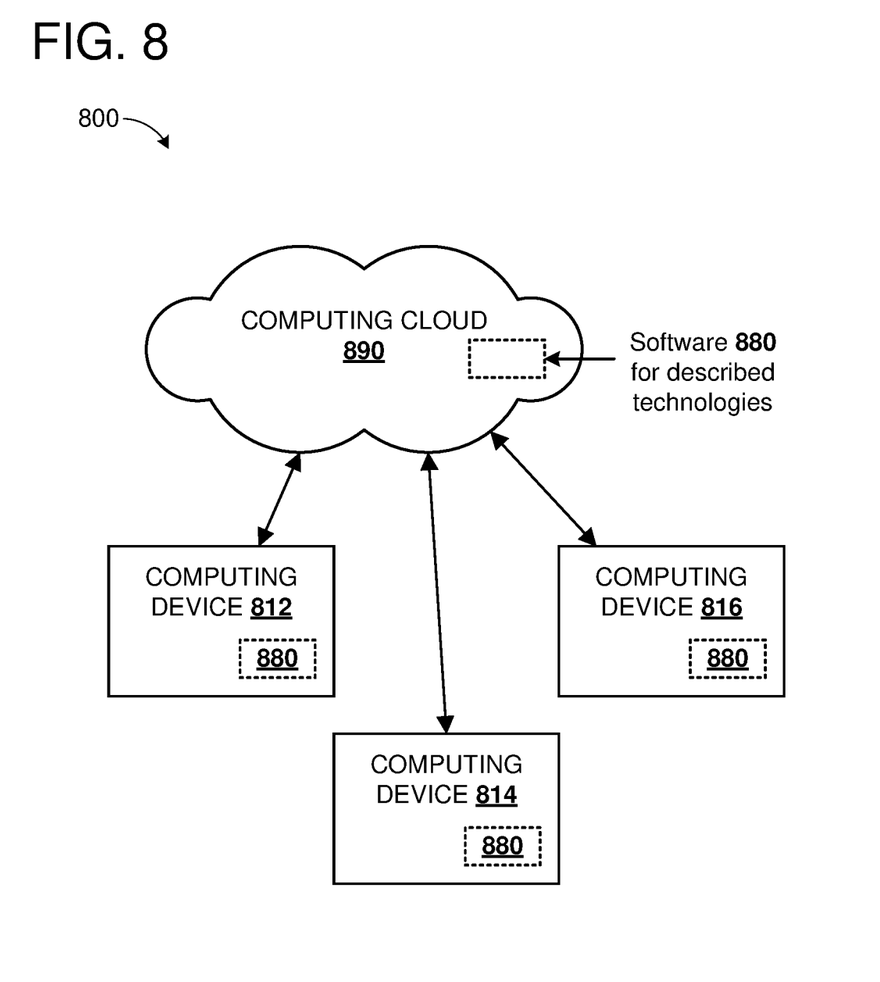
FIG. 8 is a diagram schematically depicting computing devices operating in conjunction with a computing cloud for implementation of disclosed technologies.

FIG. 8 depicts an example cloud computing environment 800 in which the described technologies can be implemented. For example, the computing environment 800 and/or one or more elements of the computing environment 800 may include and/or be included within one or more of the described components of system 100 of FIG. 1 and/or reports generator 200 of FIG. 2 and/or be used to perform operations described in correspondence to FIGS. 3-6. The cloud computing environment 800 comprises a computing cloud 890 containing resources and providing services. The computing cloud 890 can comprise various types of cloud computing resources, such as computer servers, data storage repositories, networking resources, and so forth. The computing cloud 890 can be centrally located (e.g., provided by a data center of a business or organization) or distributed (e.g., provided by various computing resources located at different locations, such as different data centers and/or located in different cities or countries).

The computing cloud 890 can be operatively connected to various types of computing devices (e.g., client computing devices), such as computing devices 812, 814, and 816, and can provide a range of computing services thereto. One or more of computing devices 812, 814, and 816 can be computers (e.g., servers, virtual machines, embedded systems, desktop, or laptop computers), mobile devices (e.g., tablet computers, smartphones, or wearable appliances), or other types of computing devices. Communication links between computing cloud 890 and computing devices 812, 814, and 816 can be over wired, wireless, or optical links, or any combination thereof, and can be short-lived or longlasting. Communication links can be continuous or sporadic. These communication links can be stationary or can move over time, being implemented over varying paths and having varying attachment points at each end. Computing devices 812, 814, and 816 can also be connected to each other.

Computing devices 812, 814, and 816 can utilize the computing cloud 890 to obtain computing services and perform computing operations (e.g., data processing, data storage, and the like). Particularly, software 880 for performing the described innovative technologies can be resident or executed in the computing cloud 890, in computing devices 812, 814, and 816, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 7, computer-readable storage media include memory 724, and storage 740. The term computer-readable storage media does not include signals and carrier waves. In addition, the term computer-readable storage media does not include communication ports (e.g., 770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media storing instructions which, when executed by one or more hardware processors, cause the hardware processors to perform actions comprising:
   receiving a request from a user controlling an avatar in a metaverse application to generate a location-aware report;

identifying a virtual location of the avatar in a metaverse world corresponding to the metaverse application;

sending the location of the avatar to a location-aware report generating service to control the location-aware report generating service to generate a report in correspondence to the location of the avatar; and retrieving the generated report and outputting the generated report for presentation in an avatar mode user interface for the metaverse application;

wherein generating the report comprises triggering a data collection job using the identified virtual location to collect data corresponding to a real-world location associated with the identified virtual location.

2. The one or more computer-readable media of claim 1, wherein the request indicates one or more parameters for the report and wherein the actions further comprise identifying the one or more parameters and sending the one or more parameters to the location-aware report generating service to control a type or content of the report.

3. The one or more computer-readable media of claim 2, wherein the request is received via a speech input device as a speech request while the user is viewing the metaverse world in the avatar mode user interface, and wherein the actions further comprise performing natural language processing to identify the one or more parameters for the report based on the speech request.

4. The one or more computer-readable media of claim 1, wherein identifying the location includes processing coordinates of the avatar provided by the metaverse application to translate the coordinates into a format that is compatible with the location-aware report generating service.

5. The one or more computer-readable media of claim 4, wherein the coordinates of the avatar are expressed in terms of a coordinate system in three-dimensional space.

6. The one or more computer-readable media of claim 1, wherein retrieving the generated report includes retrieving the generated report from a repository that includes historical reports generated for the metaverse world.

7. The one or more computer-readable media of claim 1, wherein outputting the generated report for presentation in the avatar mode user interface for the metaverse application comprises outputting a link or user interface element that is selectable by the user in the avatar mode user interface to view the report in the avatar mode user interface.

8. The one or more computer-readable media of claim 1, wherein the actions further comprise receiving, from the location-aware report generating service, a request for further information.

9. The one or more computer-readable media of claim 8, wherein the actions further comprise, in response to receiving the request for further information, sending the location-aware report generating service identification information or authentication information for the user.

10. The one or more computer-readable media of claim 9, wherein the report is selectively generated based on the identification information or the authentication information, and wherein the actions further comprise outputting an indication of unsuccessful report generation responsive to a determination that the user is not authorized to request the report based on the identification information or the authentication information.

11. A method performed by a computer, the method comprising:

retrieving a virtual location of an avatar in a metaverse world associated with a metaverse application;

processing the virtual location to generate a processed virtual location that is compatible with an enterprise system;

populating a reporting table in a backend of the enterprise system to generate a report based on the processed virtual location of the avatar to generate a location-aware report; and outputting the location-aware report for presentation to a user interface of the metaverse application;

wherein populating the reporting table comprises triggering a data collection job that uses the processed virtual location of the avatar to collect data corresponding to a real-world location associated with the processed virtual location.

12. The method of claim 11, wherein the virtual location comprises a set of coordinates for the virtual location of the avatar, and wherein processing the virtual location comprises auto-scaling the set of coordinates to map the set of coordinates to an area in the metaverse world or to the real-world location.

13. The method of claim 11, wherein the report comprises a type of report that is selected based on one or more of the processed virtual location of the avatar or parameters of a request for the report issued from the user interface of the metaverse application.

14. The method of claim 13, further comprising retrieving one or more of authentication information or user identification information for a user that issued the request and determining whether the user is authorized to generate or view the selected type of report based on the authentication information or user identification information, wherein the method further comprises outputting an indication of an unsuccessful report generation responsive to determining that the user is not authorized to generate or view the selected type of report.

15. The method of claim 11, further comprising caching the generated report in a repository of the enterprise system or a report generating service associated with the enterprise system.

16. A system, comprising:

one or more hardware processors with memory coupled thereto; and computer-readable media storing instructions executable by the one or more hardware processors, the instructions comprising:

first instructions to receive a request, while a user is controlling an avatar in a metaverse world via a user interface of a metaverse application, to generate a report corresponding to a virtual location of the avatar in the metaverse world;

second instructions to determine the virtual location of the avatar;

third instructions to trigger a data collection job to collect data corresponding to parameters of the request based on the virtual location of the avatar;

fourth instructions to generate the report including the collected data, the report corresponding to a real-world location represented in the metaverse world at the virtual location of the avatar; and fifth instructions to output the report for presentation via the user interface of the metaverse application.

17. The system of claim 16, wherein the data collection job is performed by an enterprise system backend corresponding to an entity located at the real-world location represented in the metaverse world at the virtual location of the avatar.

18. The system of claim 17, wherein the virtual location of the avatar is determined by translating location information for the avatar received from the metaverse application to a format compatible with the enterprise system backend.

19. The system of claim 16, wherein at least a portion of the report is generated using a historical report retrieved from a repository, the historical report corresponding to a prior report request received in association with the virtual location of the avatar.

* * * * *